United States Patent
Seewald et al.

(10) Patent No.: US 10,389,173 B2
(45) Date of Patent: Aug. 20, 2019

(54) PROGRAMMABLE AND APPLICATION AWARE POWER UTILITY AUTOMATION NETWORKING

(71) Applicant: Cisco Technology, Inc., San Jose, CA (US)

(72) Inventors: Maik Guenter Seewald, Nuremberg (DE); Patrick Wetterwald, Mouans Sartoux (FR)

(73) Assignee: CISCO TECHNOLOGY, INC., San Jose, CA (US)

( * ) Notice: Subject to any disclaimer, the term of this patent is extended or adjusted under 35 U.S.C. 154(b) by 312 days.

(21) Appl. No.: 15/475,499

(22) Filed: Mar. 31, 2017

(65) Prior Publication Data
US 2018/0287422 A1     Oct. 4, 2018

(51) Int. Cl.
    H02J 13/00    (2006.01)
    H04L 12/24    (2006.01)
    (Continued)

(52) U.S. Cl.
    CPC .......... *H02J 13/0062* (2013.01); *G05B 17/02* (2013.01); *G06Q 50/06* (2013.01);
    (Continued)

(58) Field of Classification Search
    CPC .... G05B 17/02; G06Q 50/06; G06Q 30/0206; H02J 3/00; H02J 3/006; H02J 3/14;
    (Continued)

(56) References Cited

U.S. PATENT DOCUMENTS 9,369,785 B1    6/2016   Schmidtke et al.
2012/0203874 A1 8/2012   Pamulaparthy
(Continued)

OTHER PUBLICATIONS

Grossman, Ed., et al., "Deterministic Networking Use Cases", [online], Oct. 3, 2016, Internet Engineering Task Force (IETF), Internet-Draft, [retrieved on Mar. 2, 2017]. Retrieved from the Internet: <URL: https://tools.ietf.org/pdf/draft-ietf-detnet-use-cases-11.pdf>, pp. 1-79.

(Continued)

*Primary Examiner* — Le H Luu
(74) *Attorney, Agent, or Firm* — Leon R. Turkevich

(57) ABSTRACT

In one embodiment, a method comprises a topology processor generating a power grid topology model of a power grid topology controlled via a communications network having a corresponding communications architecture overlying the power grid topology. The topology processor generates a communications architecture model of the communications architecture. In response to receiving a request for executing a change in at least a portion of the power grid topology, the topology processor identifies power grid topology model data associated with the portion of the power grid topology, and identifies communications architecture model data identifying a corresponding portion of the communications architecture associated with the portion of the power grid topology. The topology processor selectively executes the request based on sending, to a network controller, a query to determine whether the communications architecture can implement the change, the query identifying the power grid topology model data and the corresponding communications architecture model data.

20 Claims, 5 Drawing Sheets

(51) Int. Cl.
*H04L 12/707* (2013.01)
*G05B 17/02* (2006.01)
*G06Q 50/06* (2012.01)
*H02J 3/00* (2006.01)

(52) U.S. Cl.
CPC ...... *H02J 13/0079* (2013.01); *H02J 13/0086* (2013.01); *H04L 41/20* (2013.01); *H04L 45/22* (2013.01); *H02J 3/00* (2013.01); *H02J 2003/007* (2013.01)

(58) Field of Classification Search
CPC .............. H02J 13/0062; H02J 13/0079; H02J 13/0086; H02J 2003/007; H04L 41/20; H04L 45/22; G01R 21/133; G01R 25/00; G06F 16/5866
See application file for complete search history.

(56) References Cited

U.S. PATENT DOCUMENTS

| | | | |
|---|---|---|---|
| 2012/0310558 A1* | 12/2012 | Taft | H02J 3/00 702/61 |
| 2013/0091258 A1* | 4/2013 | Shaffer | H02J 3/00 709/221 |
| 2014/0172503 A1* | 6/2014 | Hammerstrom | G06Q 30/0206 705/7.31 |
| 2014/0317261 A1 | 10/2014 | Shatzkamer et al. | |
| 2014/0317293 A1 | 10/2014 | Shatzkamer | |
| 2014/0371941 A1 | 12/2014 | Keller et al. | |
| 2015/0280436 A1* | 10/2015 | Weckx | G06Q 50/06 700/295 |
| 2016/0285265 A1* | 9/2016 | Lin | H02J 3/006 |
| 2016/0334447 A1* | 11/2016 | Parashar | G01R 25/00 |
| 2017/0092055 A1* | 3/2017 | Brockman | G06F 16/5866 |
| 2017/0324243 A1* | 11/2017 | Ghosh | H02J 3/14 |
| 2018/0356449 A1* | 12/2018 | Leonard | G01R 21/133 |

OTHER PUBLICATIONS

International Electrotechnical Commission, IEC, "IEC 61850-90-12 TR: Communication networks and systems for power utility automation—Part 90-12: Wide area network engineering guidelines", Jan. 9, 2015, 2015 International Electrotechnical Commission, IEC, Draft Technical Report, pp. 1-202.

Dong et al., "Software-Defined Networking for Smart Grid Resilience: Opportunities and Challenges", Apr. 4, 2014, pp. 1-11.

Cahn et al., "Software-Defined Energy Communication Networks: From Substation Automation to Future Smart Grids", Oct. 21, 2013, pp. 1-6.

Survalent Technology, "Toplogy Processor, Optional Applications", [online], 2016 Survalent Technology Corporation, [retrieved on Mar. 21, 2017]. Retrieved from the Internet: <URL: https://www.survalent.com/images/Document_download/Topology_Processor_brochure.pdf>, pp. 1-4.

"Video Wall", [online], 2017 Mitsubishi Electric Visual and Imaging Systems, [retrieved on Mar. 2, 2017]. Retrieved from the Internet: <URL: http://me-vis.com/products/display-wall/utilities/>, pp. 1-2.

Byers et al., U.S. Appl. No. 15/289,755, filed Oct. 10, 2016.
Byers et al., U.S. Appl. No. 15/184,171, filed Jun. 16, 2016.

Kezunovic, "Monitoring of Power System Topology in Real-Time", 2005 IEEE, [online], [retrieved on Feb. 22, 2017]. Retrieved from the Internet: <URL: https://www.google.com/url?sa=t&rct=j&q=&esrc=s&source=web&cd=2&cad=rja&uact=8&ved=0ahUKEwi-yl3Cy4zPAhXJJR4KHdO5CEIQFggiMAE&url=http%3A%2F%2Fpserc.wisc.edu%2Fdocuments%2Fpublications%2Fpapers%2F2005_general_publications%2Fkezunovic_hicss39_paper_09-09-05.pdf&usg=AFQjCNGDSbo1kZvs5wCxp7CoRgNzPlrO5Q>, pp. 1-10.

* cited by examiner

PROGRAMMABLE AND APPLICATION AWARE POWER UTILITY AUTOMATION NETWORKING

TECHNICAL FIELD

The present disclosure generally relates to programmable and application aware power utility automation networking.

BACKGROUND

This section describes approaches that could be employed, but are not necessarily approaches that have been previously conceived or employed. Hence, unless explicitly specified otherwise, any approaches described in this section are not prior art to the claims in this application, and any approaches described in this section are not admitted to be prior art by inclusion in this section.

The modernization of the electrical power grid requires a high demand for flexibility and changeability: example modernization can include Smart Grid, Distribution Automation, and the integration of Distributed Energy Resources. The electrical power grid is composed as a power grid topology comprising generators, power transformers, busbars, transmission lines, loads, and switching components (e.g., circuit breakers). The components of the power grid topology can have sensors, actuators, controllers, etc. that are interconnected via a mesh of communication links that form a communications architecture having a corresponding network topology.

The power grid topology is controlled, via the communications architecture, by a centralized control system that communicates (via a Utility Wide Area Network) with multiple substations that deploy localized substation automation networks for control one or more Intelligent Electronic Devices (IEDs) in the substations. The centralized control system can communicate with the substations using a standardized interface such as a Supervisory Control and Data Acquisition (SCADA) system.

BRIEF DESCRIPTION OF THE DRAWINGS

Reference is made to the attached drawings, wherein elements having the same reference numeral designations represent like elements throughout and wherein.

DESCRIPTION OF EXAMPLE EMBODIMENTS

Overview

Figure 1:
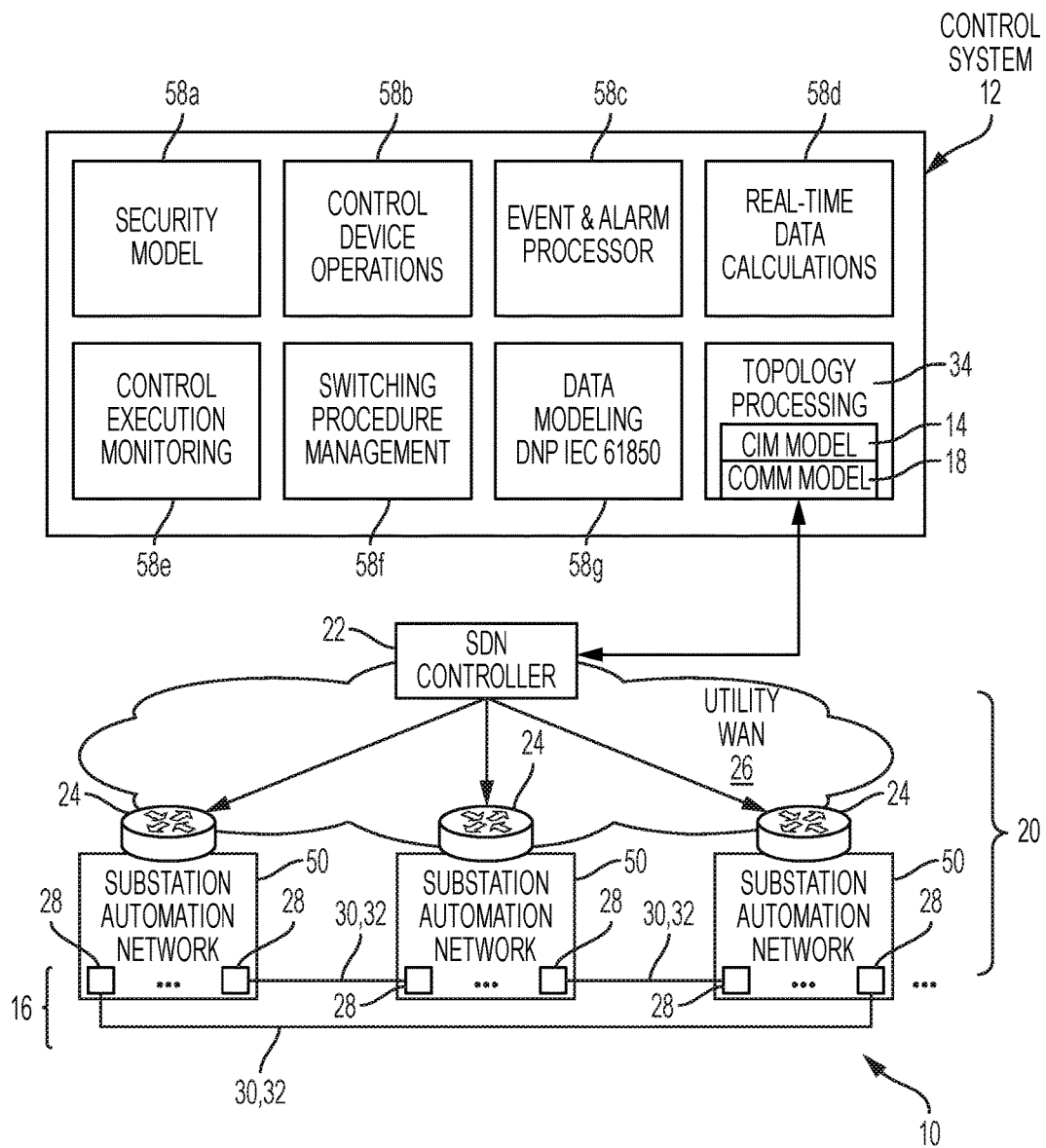
FIG. 1 illustrates an example power utility network having an apparatus for generating a power grid topology model of a power grid topology and a communications architecture model of a communications architecture for a communications network overlying the power grid topology, for generation of software defined network (SDN) configuration data based on the power grid topology model, according to an example embodiment.

In one embodiment, a method comprises a topology processor generating a power grid topology model of a power grid topology, the topology processor within a power utility control system providing exclusive management and control of the power grid topology via a communications network having a corresponding communications architecture overlying the power grid topology; the topology processor generating a communications architecture model of the communications architecture; the topology processor receiving a request for executing a change in at least a portion of the power grid topology; the topology processor identifying from the power grid topology model, in response to the request, power grid topology model data associated with the portion of the power grid topology; the topology processor further identifying from the communications architecture model, in response to the request, communications architecture model data identifying a corresponding portion of the communications architecture associated with the portion of the power grid topology; and the topology processor selectively executing the request based on sending, to a network controller, a query to determine whether the communications architecture can implement one or more communications network requirements for the change, the query identifying the power grid topology model data and the corresponding communications architecture model data.

In another embodiment, an apparatus comprises a device interface circuit, a memory circuit, and a processor circuit configured for executing a topology processor. The topology processor executed by the processor circuit is operable for generating and storing, in the memory circuit, a power grid topology model of a power grid topology, the topology processor executed within a power utility control system providing exclusive management and control of the power grid topology via a communications network having a corresponding communications architecture overlying the power grid topology. The topology processor further is operable for generating and storing, in the memory circuit, a communications architecture model of the communications architecture. The topology processor further is operable for receiving, via the device interface circuit, a request for executing a change in at least a portion of the power grid topology. The topology processor further is operable for identifying from the power grid topology model, in response to the request, power grid topology model data associated with the portion of the power grid topology. The topology processor further is operable for identifying from the communications architecture model, in response to the request, communications architecture model data identifying a corresponding portion of the communications architecture associated with the portion of the power grid topology. The topology processor further is operable for selectively executing the request based on sending, to a network controller, a query to determine whether the communications architecture can implement one or more communications network requirements for the change, the query identifying the power grid topology model data and the corresponding communications architecture model data.

In another embodiment, one or more non-transitory tangible media are encoded with logic for execution by a machine and when executed by the machine operable for: generating, by the machine executing a topology processor, a power grid topology model of a power grid topology, the topology processor within a power utility control system providing exclusive management and control of the power grid topology via a communications network having a corresponding communications architecture overlying the power grid topology; the topology processor generating a communications architecture model of the communications architecture; the topology processor receiving a request for executing a change in at least a portion of the power grid topology; the topology processor identifying from the power grid topology model, in response to the request, power grid topology model data associated with the portion of the power grid topology; the topology processor further identifying from the communications architecture model, in response to the request, communications architecture model data identifying a corresponding portion of the communications architecture associated with the portion of the power grid topology; and the topology processor selectively executing the request based on sending, to a network controller, a query to determine whether the communications architecture can implement one or more communications network requirements for the change, the query identifying the power grid topology model data and the corresponding communications architecture model data.

In another embodiment, a method comprises: a network controller obtaining, from a topology processor in a power utility control system, power grid topology model data identifying at least a portion of a power grid topology, the power utility control system providing exclusive management and control of the power grid topology via a communications network having a corresponding communications architecture overlying the power grid topology; the network controller obtaining, from the topology processor, communications architecture model data identifying a corresponding portion of the communications architecture associated with the portion of the power grid topology; the network controller determining, based on the power grid topology model data and the communications architecture model data, a communications network requirement for controlling at least the portion of the power grid topology via the communications architecture; the network controller generating, based on the power grid topology model data, software defined network (SDN) configuration data for implementing the communications network requirement in the communications architecture.

In another embodiment, an apparatus comprises a device interface circuit and a processor circuit. The processor circuit is configured for executing a network controller, wherein the network controller executed by the processor circuit is operable for obtaining, from a topology processor in a power utility control system, power grid topology model data identifying at least a portion of a power grid topology, the power utility control system providing exclusive management and control of the power grid topology via a communications network having a corresponding communications architecture overlying the power grid topology. The network controller further is operable for obtaining, from the topology processor, communications architecture model data identifying a corresponding portion of the communications architecture associated with the portion of the power grid topology. The network controller further is operable for determining, based on the power grid topology model data and the communications architecture model data, a communications network requirement for controlling at least the portion of the power grid topology via the communications architecture. The network controller further is operable for generating, based on the power grid topology model data, software defined network (SDN) configuration data for implementing via the device interface circuit the communications network requirement in the communications architecture.

In another embodiment, one or more non-transitory tangible media are encoded with logic for execution by a machine and when executed by the machine operable for: obtaining, by the machine executing a network controller, power grid topology model data identifying at least a portion of a power grid topology from a topology processor in a power utility control system, the power utility control system providing exclusive management and control of the power grid topology via a communications network having a corresponding communications architecture overlying the power grid topology; the network controller obtaining, from the topology processor, communications architecture model data identifying a corresponding portion of the communications architecture associated with the portion of the power grid topology; the network controller determining, based on the power grid topology model data and the communications architecture model data, a communications network requirement for controlling at least the portion of the power grid topology via the communications architecture; the network controller generating, based on the power grid topology model data, software defined network (SDN) configuration data for implementing the communications network requirement in the communications architecture.

DETAILED DESCRIPTION

Particular embodiments integrate communications between a centralized power utility control system and a network controller, where the centralized power utility control system provides exclusive management and control of a power grid topology via a communications network, and the network controller manages and configures the corresponding communications architecture of the communications network overlying the power grid topology. The integration of communications between the centralized power control system and the network controller enables Software Defined Networking (SDN) in the domain of power utility automation Networks. In other words, the communication between the power utility control system and the network controller enables the network controller to become "power application aware" in the dynamic deployment, configuring, and management of the communications architecture in response to the power grid topology.

FIG. 1 illustrates an example power utility network 10 having one or more apparatus 12 for generating a power grid topology model 14 of a power grid topology 16 and a communications architecture model 18 of a communications architecture 20 for a communications network (20' of FIG. 2) overlying the power grid topology 16, for generation of software defined network (SDN) configuration data based on the power grid topology model 14, according to an example embodiment. The apparatus 12 of FIG. 1 can be implemented as a power utility control system providing exclusive management and control of the power grid topology 16 via the communications network 20' overlying the power grid topology 16 and having the communications architecture 20 overlying the power grid topology 16. As described in further detail below, the control system 12 can comprise one or more computing devices such as server computers or rack-mounted "blade servers" configured for executing various operations described herein.

As described in further detail below, the power utility network 10 also includes a network controller 22, for example an SDN controller, configured for monitoring, managing, and controlling the communications network 20' (as represented logically by the communications architecture 20). The communications network 20' can include Internet Protocol (IP) based routers 24, Multiprotocol Label Switching (MPLS) routers (not shown), communication links (not shown), etc. that form a utility wide area network (WAN) 26 within the communications network 20'. The communications network 20' also can include various communications links, link layer switches, firewall devices, remote terminal units (RTUs), SCADA devices, etc. used for forming a substation automation network within one or more substations 50. For example, each substation 50 can include numerous IEDs 28 that can supply electrical power to another substation 50 via power transmission lines 30: each power transmission line 30 is part of the power grid topology 16 and can have an associated teleprotection link 32 that is part of the communications network 20' (and the communications architecture 20) for communication of data associated with monitoring and control of the electrical power on the corresponding transmission line 30. Hence, each data link providing sensor and/or control data to and/or from any power grid topology component is part of the communications network 20' and the communications architecture 20.

As described in further detail below, the control system 12 also includes a topology processor 34 configured for receiving power grid component data for each component of the power grid topology 16, and generating a power grid topology model 14. The control system 12 also can include other systems 58 for controlling the power grid topology 16 (e.g. fulfilling energy management functions), for example a security model 58a, control device operations 58b, an event and alarm processor 58c, a real-time data calculation processor 58d for real-time monitoring of operations data, a control execution monitoring processor 58e for monitoring execution in the power grid topology 16 of commands supplied by the control system 12, a switching procedure management processor 58f for managing power switching operations in the power grid topology 16, and a data modeling processor 58g configured for establishing and maintaining models of the power grid topology 16 according to IEC 61850 and DNP.

Figure 2:
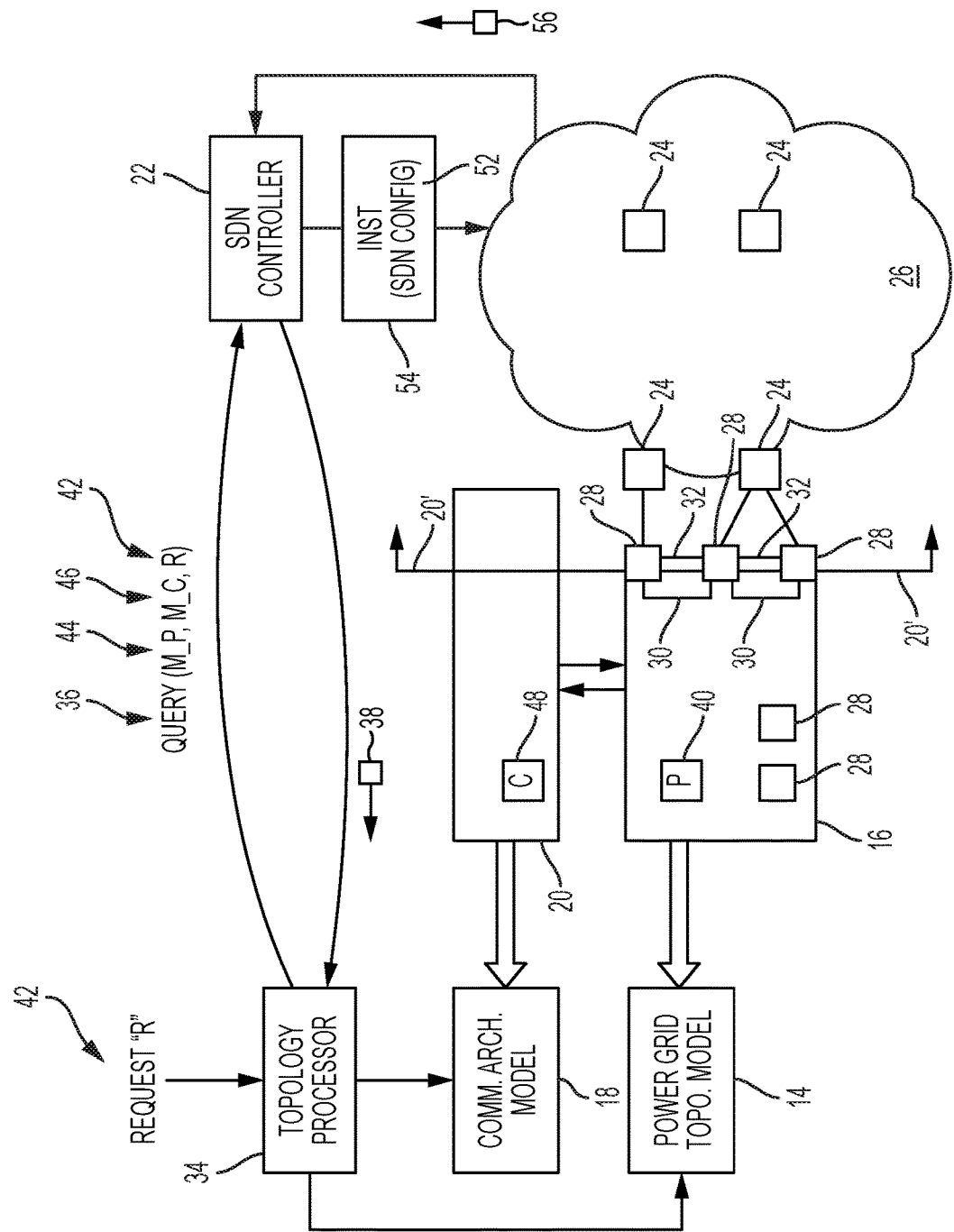
FIG. 2 illustrates the power utility network of FIG. 1 comprising a topology processor for generating the power grid topology model and the communications architecture model, in communication with a network controller generating SDN configuration data for implementing a communications network requirement in the communications architecture based on the power grid topology model data, according to an example embodiment.

FIG. 2 illustrates the power utility network 10 of FIG. 1 comprising the topology processor 34 executable within the control system 12. The topology processor 34 is configured for generating the power grid topology model 14 of the power grid topology 16. The topology processor 34 also is configured for generating the communications architecture model 18 of the communications architecture 20. The topology processor 34 also is configured for communication with the network controller 22, for example based on exchanging messages 36, 38 with the SDN controller 22. As described below, the SDN controller 22 is configured for generating SDN configuration data 52 for implementing a communications network requirement in the communications architecture for a requested portion "P" 40 of the power grid topology 16, according to an example embodiment.

Prior power grid control systems were established with the assumption that the communications architecture (used to monitor and control the underlying power grid topology) was fixed and always available; hence, the power grid control systems were separate and distinct from any management or configuration of the communications architecture. Consequently, any change in the power grid topology had to be addressed by manual configuration in the communications network overlying the power grid topology, preventing any dynamic management of the communications architecture in response detected changes in the power grid operations or topology. Moreover, power grid control systems would be unaware of any changes in operational status or topology status in the communications architecture used to control the power grid topology.

According to example embodiments, the topology processor 34 in the power utility control system 12 can generate not only a power grid topology model 14 of the existing power grid topology 16, but also a communications architecture model 18 of the existing communications architecture 20 overlying the power grid topology 16. The communications architecture model 18 can be generated based on the topology processor 34 applying a determined mapping between power grid topology component data (including intra-substation and inter-substation components and associated operational data) relative to network component data that identifies network components in the communications network 20' and associated network component attributes.

Hence, the topology processor 34 can respond to a request 42 for executing a topological or operational change in a portion "P" 40 of the power grid topology 16 (e.g., an operation change in the portion "P" 40 the power grid topology 16 such as initiating, rerouting, or terminating supply of electrical power between substations 50; activating a new substation 50 or an Intelligent Electronic Device (IED) 28 within a substation 50; responding to a sensor alarm (e.g., overvoltage, short circuit, etc.): the topology processor 34 can respond to the request "R" 42 by identifying power grid topology model data (e.g., "M_P") 44 associated with the portion "P" 40 of the power grid topology 16, identifying communications architecture model data (e.g., "M_C") 46 identifying a corresponding portion "C" 48 of the communications architecture 20 associated with the portion 40 of the power grid topology 16, and selectively executing the request "R" 42 based on sending a query/request message 36 to the SDN controller 22 to determine whether the communications architecture 20 can implement any necessary communication network requirements for the change in the portion "P" 40, relative to the power grid topology model data "M_P" 44 and the corresponding communications architecture model data "M_C" 46 identified in the query/request message 36.

The SDN controller 22, in response to receiving the query/request message 36, can determine any necessary communications network requirements for controlling the corresponding portion "P" 40 based on the power grid topology model data "M_P" 44 and the corresponding communications architecture model data "M_C" 46, and whether the communication network requirements for controlling the portion "P" 40 can be implemented in the communications architecture 20. The SDN controller 22 can generate, based on the power grid topology model data 44 and the communications architecture model data 46, SDN configuration data 52 for implementing the communications network requirements in the communications architecture 20, and can send instructions 54 specifying the SDN configuration data 52 to one or more network devices (e.g., 24) in the communications network 20'. In response to the SDN controller 22 receiving a reply 56 from one or more of the network devices (e.g., a reply acknowledging implementation of the SDN configuration data 52, a reply indicating failure in implementing the SDN configuration data 52, or a network status such as an SNMP message, etc.) the SDN controller 22 can send a reply/status message 38 to the topology processor 34.

Hence, the topology processor 34, in response to receiving the reply/status message 38, can dynamically determine the operational status of the communications network 20' managed by the SDN controller 22, including whether the communications architecture 20 can implement communication network requirements for a requested change, whether problems are detected in the communications network 20', etc. Hence, the communications between the topology processor 34 and the SDN controller 22 enabling a programmable and application aware power utility automation networking using the existing communications network 20' (i.e., without the necessity of replacing or upgrading components of the existing communications network 20').

Figure 3:
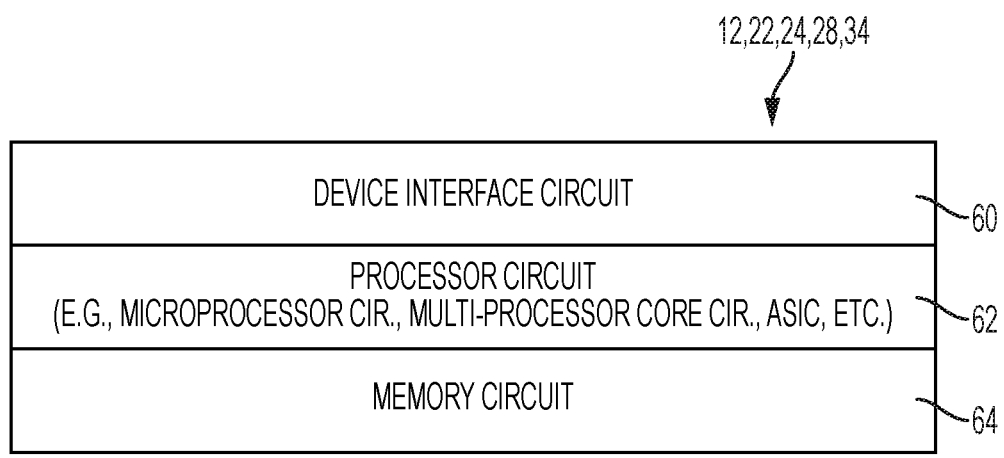
FIG. 3 illustrates an example apparatus implementing any one of the topology processor and/or the network controller of FIGS. 1 and 2, according to an example embodiment.

FIG. 3 illustrates an example implementation of any one of the devices 12, 22, 24, 28, and/or 34, according to an example embodiment. Additional components may be added to any one of these devices 12, 22, 24, 28, and/or 34, as appropriate. Each apparatus 12, 22, 24, 28, and/or 34 is a physical machine (i.e., a hardware device) or a physical component thereof, and configured for implementing network communications with other physical machines via wired and/or wireless data links, as appropriate.

Each apparatus 12, 22, 24, 28, and/or 34 can include a device interface circuit 60, a processor circuit 62, and a memory circuit 64. The device interface circuit 60 can include one or more distinct physical layer transceivers for communication with any one of the other devices 12, 22, 24, 28, and/or 34; the device interface circuit 60 also can include an IEEE based Ethernet transceiver for communications with the devices of FIG. 1 via any type of data link (e.g., a wired or wireless link, an optical link, etc.). The processor circuit 62 can be configured for executing any of the operations described herein, and the memory circuit 64 can be configured for storing any data or data packets as described herein. The term "configured for" or "configured to" as used herein with respect to a specified operation refers to a device and/or machine that is physically constructed and arranged to perform the specified operation; for example, the SDN controller 22 and/or the topology processor 34 can be executed by a processor circuit 62, such that the SDN controller 22 and/or the topology processor 34 executed by a processor circuit 62 can be operable for executing operations described herein.

Each apparatus 12, 22, 24, 28, and/or 34 can be implemented as a distinct stand-alone device (e.g., a server computer device), or as part of a larger physical structure (e.g., a rack-mounted computing component implemented within a single physical structure such as a multi-blade enclosure). In some cases, virtualization techniques can be applied for sharing of the device interface circuit 60, the processor circuit 62, and the memory circuit 64; for example the SDN controller 22 and the topology processor 34 could be executed within the same physical machine.

Any of the disclosed circuits of the devices 12, 22, 24, 28, and/or 34 (including the device interface circuit 60, the processor circuit 62, the memory circuit 64, and their associated components) can be implemented in multiple forms. Example implementations of the disclosed circuits include hardware logic that is implemented in a logic array such as a programmable logic array (PLA), a field programmable gate array (FPGA), or by mask programming of integrated circuits such as an application-specific integrated circuit (ASIC). Any of these circuits also can be implemented using a software-based executable resource that is executed by a corresponding internal processor circuit such as a microprocessor circuit (not shown) and implemented using one or more integrated circuits, where execution of executable code stored in an internal memory circuit (e.g., within the memory circuit 64) causes the integrated circuit(s) implementing the processor circuit to store application state variables in processor memory, creating an executable application resource (e.g., an application instance) that performs the operations of the circuit as described herein. Hence, use of the term "circuit" in this specification refers to both a hardware-based circuit implemented using one or more integrated circuits and that includes logic for performing the described operations, or a software-based circuit that includes a processor circuit (implemented using one or more integrated circuits), the processor circuit including a reserved portion of processor memory for storage of application state data and application variables that are modified by execution of the executable code by a processor circuit. The memory circuit 64 can be implemented, for example, using a non-volatile memory such as a programmable read only memory (PROM) or an EPROM, and/or a volatile memory such as a DRAM, etc.

Further, any reference to "outputting a message" or "outputting a packet" (or the like) can be implemented based on creating the message/packet in the form of a data structure and storing that data structure in a non-transitory tangible memory medium in the disclosed apparatus (e.g., in a transmit buffer). Any reference to "outputting a message" or "outputting a packet" (or the like) also can include electrically transmitting (e.g., via wired electric current or wireless electric field, as appropriate) the message/packet stored in the non-transitory tangible memory medium to another network node via a communications medium (e.g., a wired or wireless link, as appropriate) (optical transmission also can be used, as appropriate). Similarly, any reference to "receiving a message" or "receiving a packet" (or the like) can be implemented based on the disclosed apparatus detecting the electrical (or optical) transmission of the message/packet on the communications medium, and storing the detected transmission as a data structure in a non-transitory tangible memory medium in the disclosed apparatus (e.g., in a receive buffer). Also note that the memory circuit 64 can be implemented dynamically by the processor circuit 62, for example based on memory address assignment and partitioning executed by the processor circuit 62.

Figure 4:
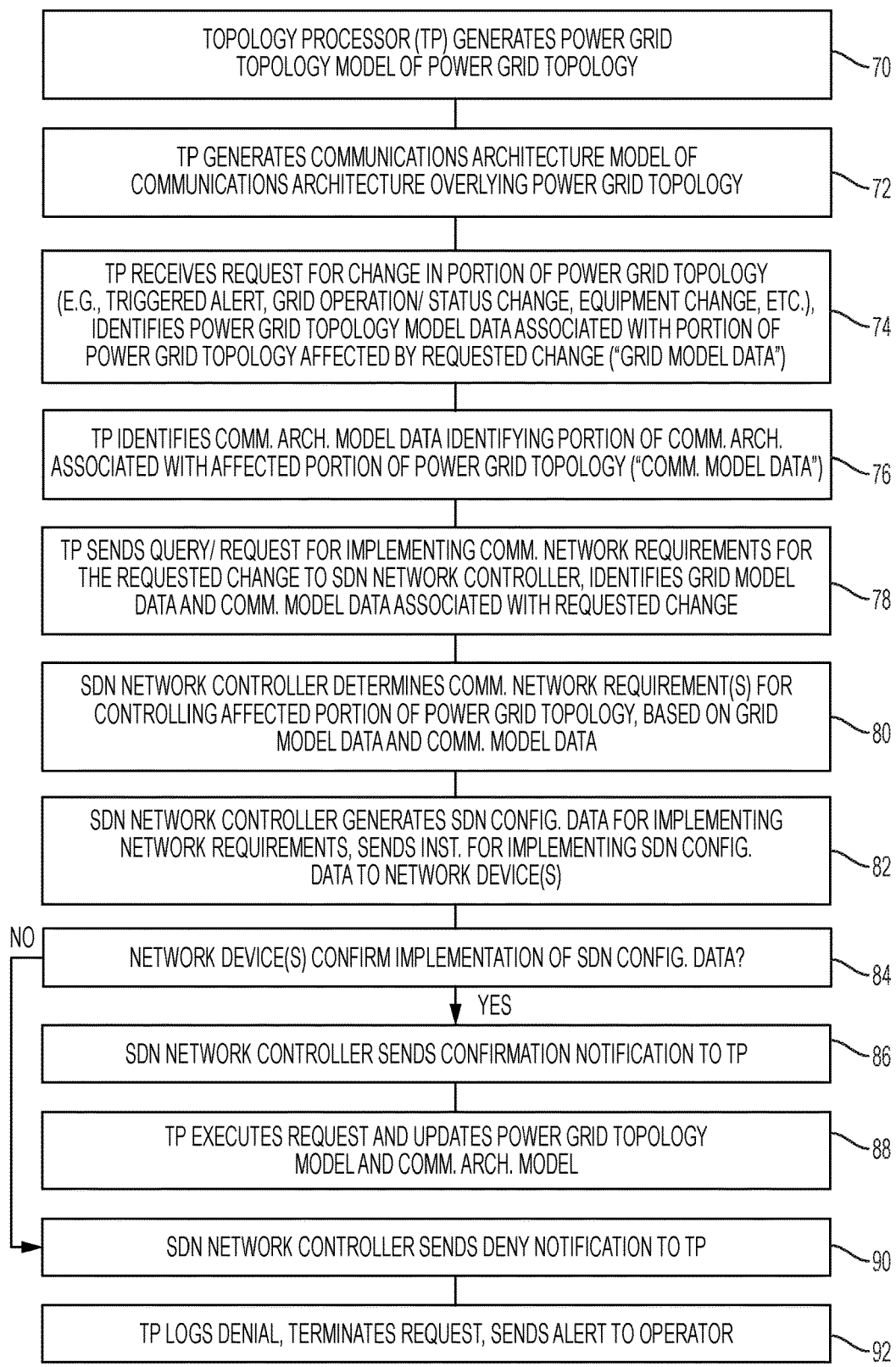
FIG. 4 illustrates a method of programmable and application aware power utility automation networking, based on a topology processor and a network controller exchanging messages relative to a power grid topology model and a communications architecture model, according to an example embodiment.

FIG. 4 illustrates a method of programmable and application aware power utility automation networking, based on a topology processor and a network controller exchanging messages relative to a power grid topology model and a communications architecture model, according to an example embodiment. The operations described with respect to any of the Figures can be implemented as executable code stored on a computer or machine readable non-transitory tangible storage medium (i.e., one or more physical storage media such as a floppy disk, hard disk, ROM, EEPROM, nonvolatile RAM, CD-ROM, etc.) that are completed based on execution of the code by a processor circuit implemented using one or more integrated circuits; the operations described herein also can be implemented as executable logic that is encoded in one or more non-transitory tangible media for execution (e.g., programmable logic arrays or devices, field programmable gate arrays, programmable array logic, application specific integrated circuits, etc.). Hence, one or more non-transitory tangible media can be encoded with logic for execution by a machine, and when executed by the machine operable for the operations described herein.

In addition, the operations described with respect to any of the Figures can be performed in any suitable order, or at least some of the operations can be performed in parallel. Execution of the operations as described herein is by way of illustration only; as such, the operations do not necessarily need to be executed by the machine-based hardware components as described herein; to the contrary, other machine-based hardware components can be used to execute the disclosed operations in any appropriate order, or execute at least some of the operations in parallel.

Referring to FIG. 4 the processor circuit 62 of the topology processor 34 (e.g., the processor circuit 62 executing the operations of the topology processor 34) is configured for generating in operation 70 a power grid topology model 14 of the power grid topology 16. As illustrated in FIG. 1, the topology processor 34 can be executed within a power utility control system 12 that provides exclusive management and control of the power grid topology 16 via the communications network 20' overlying the power grid topology 16; the communications network 20' has a corresponding communications architecture 20 overlying the power grid topology 16. The generation of the power grid topology model 14 is described in further detail below with respect to FIG. 5.

Figure 5:
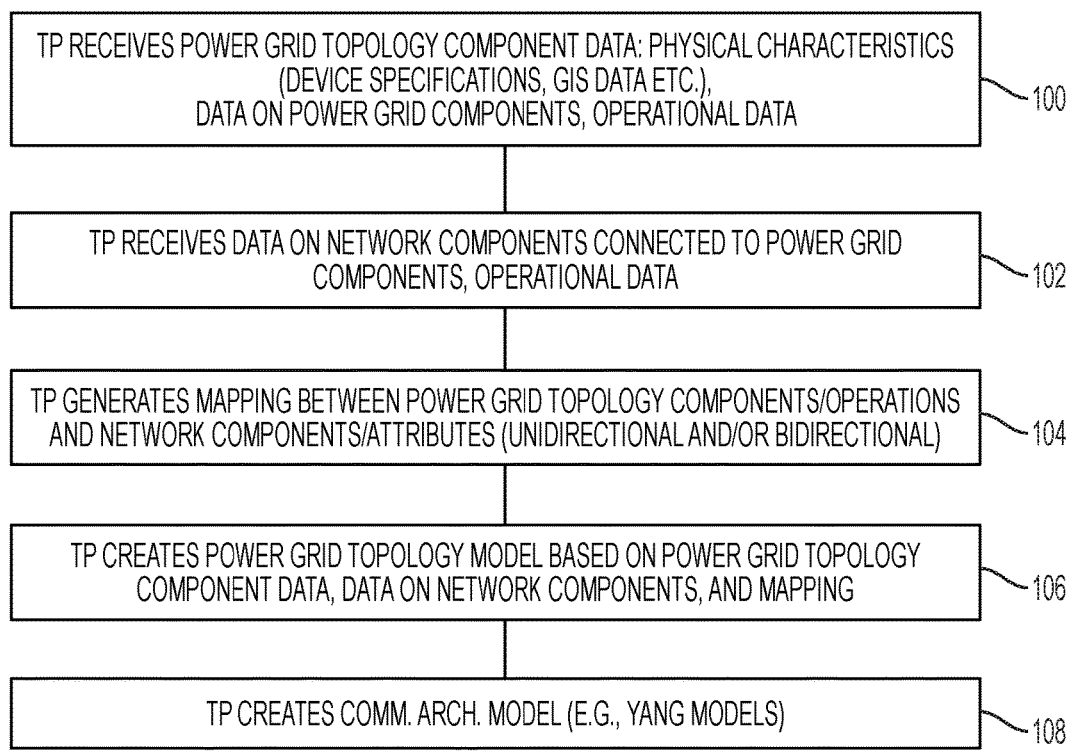
FIG. 5 illustrates example generation of the power grid topology model and the communications architecture model, according to an example embodiment.

The processor circuit 62 of the topology processor 34 (e.g., the processor circuit 62 executing the operations of the topology processor 34) is configured for generating in operation 72 a communications architecture model 18 of the communications architecture 20, described in further detail with respect to FIG. 5. Hence, the topology processor 34 can maintain the power grid topology model 14 and the communications architecture model 18 in its memory circuit 64 and/or an external memory, as appropriate. As described in further detail below, the power grid topology model 14 and/or the communications architecture model 18 can be based on prescribed model formats, for example a Common Information Model (CIM), a Geographic Information System (GIS), a Substation Configuration Language (SCL) according to International Electrotechnical Commission (IEC) Standard 61850, Distributed Network Protocol (DNP3), Unified Modeling Language (UML), etc. The models 14, 18 enable the topology processor 34 and the SDN controller 22 to communicate with respect to the logical architectures and states of the respective power grid topology 16 and the communications network 20', enabling both the SDN controller 22 and the topology processor 34 to respond to any changes in the communications architecture model 16 or the communications network 20'.

For example, the processor circuit 62 executing the topology processor 34 can be configured for (e.g., operable for) receiving in operation 74 a request "R" 42 for executing a change in at least a portion "P" 40 of the power grid topology 16; the "change" can include any one of a triggered sensor alert (e.g., high current status, overvoltage, faulty power grid component, etc.), a grid operation parameter (e.g., percent capacity utilization, etc.), an equipment change such as adding or removing a power grid component such as an IED 28, a power transmission line 30, an RTU, etc.; or responding to a sensor alert.

In response to receiving the request "R" 42, the request "R" 42 executing the topology processor 34 can identify, from the power grid topology model 14, power grid topology model data (e.g., "M_P") 44 associated with the portion "P" 40 of the power grid topology 16. The topology processor 34 further can be configured for identifying in operation 76, from the communications architecture model 20 in response to the request "R" 42, the communications architecture model data "M_C" 46 that identifies the corresponding portion "C" 48 of the communications architecture 20 associated with the portion "P" 40 of the power grid topology 16. The topology processor 34 can selectively execute the request "R" 42 based on generating in operation 78 a query/request message 36 that identifies the power grid topology model data 44 and the communications architecture model data 46, for example based on explicitly including the data associated with the power grid topology model data 44 and the communications architecture model data 46, and/or by including reference addresses (e.g., a Universal Resource Identifier) that identifies respective locations of the power grid topology model data 44 and/or the communications architecture model data 46. The processor circuit 62 executing the topology processor 34 in operation 78 can send the query/request message 36 to the SDN controller 22, for example using an application programming interface (API), a remote procedure call (RPC), and/or the device interface circuit 60 for transmission via a data link, as appropriate.

Hence, the query/request message 36 sent by the topology processor 34 in operation 78 enables the topology processor 34 to determine whether the communications architecture 20 can implement one or more communications network requirements for the change specified in the request "R" 42. The device interface circuit 60 of the SDN controller 22 is configured for receiving in operation 80 the query/request message 36 identifying the request "R" 42, the corresponding power grid topology model data 44, and the corresponding communications architecture model data 46. In response to receiving the query/request message 36, the processor circuit 62 of the SDN controller 22 in operation 80 is configured for obtaining the power grid topology model data power grid topology model data 44 corresponding to the request "R" 42 and that identifies the portion "P" 40 of the power grid topology 16 (e.g., from the query/request message 36 and/or from a local and/or remote database).

The processor circuit 62 of 22 in operation 80 also is configured for obtaining the communications architecture model data 46 for the corresponding portion "C" 48 of the communications architecture 20 associated with the portion "P" 40 of the power grid topology 16 (e.g., from the query/request message 36 and/or from a local and/or remote database). Hence, the processor circuit 62 of the SDN controller 22 in operation 80 can determine any communications network requirement for controlling at least the portion "P" 40 of the power grid topology 16 via the communications architecture 20, based on the associated power grid topology model data 44 and communications architecture model data 46. For example, the processor circuit 62 of the SDN controller 22 can determine whether a deterministic flow needs to be established via one or more data links between one or more IEDs 28 between two or more substations 50, or between any other two components in the power grid topology 16. The processor circuit 62 of the SDN controller 22 also can determine whether sufficient quality of service (QoS), bandwidth, etc., is available between two devices in the power grid topology 16, whether a guaranteed latency can maintained between two devices in the power grid topology 16, etc. The processor circuit 62 of the SDN controller 22 also can determine whether virtualized services can be established between two components in the power grid topology 16, for example dynamic installation of security procedures such as a virtual private network (VPN), load balancing, whether reliable clock sources are available for a time sensitive network, etc.

Hence, the processor circuit 62 of the SDN controller 22 (e.g., the processor circuit 62 executing the SDN controller 22) can determine in operation 80 the communication network requirements required for SDN-enabled control of the affected portion "P" 40 of the power grid topology 16. The processor circuit 62 of the SDN controller 22 in operation 82 can generate SDN configuration data 52 for implementing the network requirements (e.g., within a virtualized network infrastructure) based on the request "R" 42, the power grid topology model data 44, and the communications architecture model data 46. The processor circuit 62 executing the SCN controller 22 can send in operation 82 instructions 54 specifying the SDN configuration data 52 to one or more network devices (e.g., 24) in the communications network 20'. For example, the processor circuit 62 of the SDN controller 22 can apply the power grid topology model data 44 and the communications architecture model data 46 to available SDN models utilized by the SDN controller 22 for control and management of the SDN in the SDN controller 22, for example using YANG models (YANG is a data modeling language used to model configuration and state data of network elements).

Hence, the one or more network devices (e.g., 24, 28, etc.) receiving the instructions 54 can execute the SDN configuration data 52 to implement the communications network requirement for the request "R" 42 received by the topology processor 34, and in response send a reply 56 indicating successful deployment of the communications network requirement; if the network device (e.g., 24, 28, etc.) is unable to execute the received SDN configuration data 52, the reply 56 can specify that the SDN configuration data 52 has not been implemented, or another status message can be sent (e.g., indicating that deployment of the SDN configuration data 52 can affect another identified network service).

The processor circuit 62 executing the SDN controller 22, in response to receiving the reply 56 generated by the network device (e.g., 24, 28, etc.), can determine in operation 84 whether the network device confirmed implementation of the SDN configuration data 52. If the processor circuit 62 of the SDN controller 22 determines the reply 56 confirms implementation of the SDN configuration data 52, the processor circuit 62 executing the SDN controller 22 in operation 86 can send to the topology processor 34 a reply/status message 38 that confirms that the communications network requirement has been implemented for the requested change. The processor circuit 62 executing the topology processor 34 can respond in operation 88 to the reply 56 confirming implementation of the communication network requirements by executing the request "R" 42, for implementing the change in the portion "P" 40 of the power grid topology 16; the processor circuit 62 executing the topology processor 34 in operation 88 also can update the power grid topology model 14 and the communications architecture model 18 based on the reply/status message 38.

If in operation 84 the processor circuit 62 of the SDN controller 22 determines from the received reply 56 that the network device cannot implement the SDN configuration data 52 as requested, the processor circuit 62 executing the SDN controller 22 in operation 90 can send the reply/status message 38 specifying a denial notification indicating that the communication network requirements for the requested change cannot be implemented in the communications architecture 20. The processor circuit 62 of the topology processor 34, in response to receiving the reply/status message 38 specifying that the communications network requirements were unavailable for the change, can log in operation 92 the denial notification specified in the reply/status message 38, and can terminate the request "R" 42; if desired, the topology processor 34 also can send an alert to a control system operator operating the control system 12.

Hence, the messaging between the SDN controller 22 and the topology processor 34 enables the topology processor 34 to be aware of the state of the communications network 20', including the logical connections and network-based services provided by and managed by the SDN controller 22. Further, the topology processor 34 can respond to any status message 38 sent by the SDN controller 22, including a reply 56 indicating an alert or notification, for example a congestion notification for an identified traffic flow, disruption of an identified network service, etc.

Hence, the reply/status message 38 output by the SDN controller 22 can specify any one of: implementation of a communications network requirement, identification of one or more network services executed in the communications network, identification of one or more network traffic flows in the communications network, or identification of disruption of any one of the network services or any one of the network traffic flows. Consequently the topology processor 34 can proactively execute corrective measures in the power grid topology 16 (e.g., rerouting power transmission, shutting down a TED 28 or a substation 50) in order to mitigate any adverse conditions detected by the SDN controller 22 in the communications network 20'.

Hence, the topology processor 34 and the SDN controller 22 can coordinate management operations in the communications network 20' with power management operations in the power grid topology 16, effectively establishing a dynamic management of the communications architecture 20 relative to the power grid topology 16 based on the correlation between the power grid topology model 14 and the communications architecture model 18, enabling a feedback loop-type management between the topology processor 34 and the SDN controller 22. Example coordination can include the SDN controller 22 provisioning, configuring, and/or managing communication network capacity (such as allocating or prioritizing bandwidth, Quality of Service, path symmetry) in response to the topology processor 34 responding to power grid events such as starting a new power plant for increased demand, load balancing of electrical distribution, detecting a failed transmission line, detecting a failed TED, detecting operator commands such as maintenance commands).

FIG. 5 illustrates example generation of the power grid topology model 14 and the communications architecture model 18, according to an example embodiment. The topology processor 34 in operation 100 can receive power grid topology component data, for example from an operator submitting a request 42, and/or from the data modeling processor 58g. Example data received by the topology processor 34 can include data on power grid components, intra-substation and inter-substation components (e.g., transmission lines, transformers, switches/relays/circuit breakers, substation identifiers, IEDs 28, power generators, other grid components), etc. Any one of the components of the power grid topology 16 can be described using various data types (e.g., GIS, CIM, IEC 61850 SCL Models). The topology processor 34 also can receive operational data describing the existing operational state of any one of the power grid components (e.g., voltage, current, power, Normal/Overload/Offline status, etc.). The topology processor 34 can display interconnections between the power grid components as a line diagram for display in a centralized power system control center, if desired.

The topology processor 34 in operation 102 receives (e.g., from a network operator and/or the data modeling processor 58*g*) network component data. The network component data identifies the network components in the communications architecture 20 that are connected to the power grid components (e.g., sensors, actuators, RTUs), interconnecting network components (e.g., data links/cables/optical fibers, teleprotection links 32, multiplexers/demultiplexers, network bridges, network switches, routers 24, substation local area networks (LANs), etc.), or management components (e.g., routers, firewalls/security appliances, gateways, clock sources, controllers (e.g., SCADA)) (e.g., GIS Data, SCL Models). The network component data also can include associated network component attributes or operational data (e.g., bandwidth, QoS, redundancy, load balancing, deterministic flow identification, security settings (e.g., VPN), etc.). The topology processor 34 also may send queries regarding any of these attributes to the SDN controller 22, as desired.

The topology processor 34 in operation 104 is configured for generating the communications architecture model 18 based on generating a determined mapping between the power grid topology component data relative to the network component data. As described below, the mapping generated by the topology processor 34 in operation 104 can establish the relationship between the physical power grid components in the power grid topology 16 and the physical communications components in the communications network 20'.

The topology processor 34 in operation 106 generates the power grid topology model 14 based on the power grid topology component data, the network component data, and based on applying the mapping in 104 to establish a correlation in the relationship between the physical power grid components and the physical communications network components (e.g., a bidirectional index between a power grid component and a communication network component).

The topology processor 34 in operation 108 generates the communications architecture model 18 based on the power grid topology model 14 and the mapping established in operation 104. The communications architecture model 18 can be stored in the memory circuit 64 according to any one of the above-described data models (e.g., YANG model).

Hence, the communications architecture model 18 for any portion "C" 48 of the communications architecture 20 can identify any network element associated with the corresponding portion "P" 40 of the power grid topology 16. Any network element can be identified in the communications architecture model 18, for example a physical data link, one or more sensor devices coupled to the data link, one or more IEDs 28 coupled to the data link, or one or more RTUs coupled to the data link.

The following mappings may be applied in operation 104 to establish the functional relationships between the power grid topology model 14 and the communications architecture model 18. Mappings can be established between power transmission lines 30 between substations that are mapped to the teleprotection links 32 and associated communication attributes (e.g., bandwidth, QoS, redundancy, security, VPN, etc.). Mappings also can be established between power transmission lines between substations and a control center that are mapped to the associated data links between the substations 50 and the control center (e.g., 12), along with the associated communication attributes. Mappings also can be established between power transmission lines to/from distributed power generators (e.g., wind, solar) that are mapped to the associated data links and the associated communication attributes. Mappings also can be established between power transmission lines to/from primary power grid equipment (e.g., transformers, power storage units) that are mapped to the associated data links coupled to the primary grid equipment, along with the associated communication attributes.

Mappings also can be applied in operation 104 between power grid management applications (e.g., 58*a* to 58*g*) executed in the control system 12 and the network management applications executed in the SDN controller 22, enabling coordinated management between the power grid topology 16 and the communications architecture 20. Mappings also can be applied in operation 104 between grid triggers (e.g., model changes, status changes in the operation of the power grid topology 16, topology changes in the power grid topology 16, etc.) and network management operations. Hence, operations in a power grid control center can be integrated and coordinated with network operations in a software defined network.

While the example embodiments in the present disclosure have been described in connection with what is presently considered to be the best mode for carrying out the subject matter specified in the appended claims, it is to be understood that the example embodiments are only illustrative, and are not to restrict the subject matter specified in the appended claims.

What is claimed is:

1. A method comprising:

a topology processor generating a power grid topology model of a power grid topology, the topology processor within a power utility control system providing exclusive management and control of the power grid topology via a communications network having a corresponding communications architecture overlying the power grid topology;

the topology processor generating a communications architecture model of the communications architecture;

the topology processor receiving a request for executing a change in at least a portion of the power grid topology;

the topology processor identifying from the power grid topology model, in response to the request, power grid topology model data associated with the portion of the power grid topology;

the topology processor further identifying from the communications architecture model, in response to the request, communications architecture model data identifying a corresponding portion of the communications architecture associated with the portion of the power grid topology; and the topology processor selectively executing the request based on sending, to a network controller, a query to determine whether the communications architecture can implement one or more communications network requirements for the change, the query identifying the power grid topology model data and the corresponding communications architecture model data.

2. The method of claim 1, wherein the selectively executing includes one of:

executing the request in response to receiving, from the network controller, a confirmation that the communications network requirements for the change has been implemented; or terminating the request in response to receiving, from the network controller, a notification that the communications network requirements were unavailable for the change.

3. The method of claim 1, further comprising updating the communications architecture model in response to one or more messages from the network controller describing the communications architecture.

4. The method of claim 3, wherein the one or more messages specify any one of implementation of the one or more communications network requirements, identification of one or more network services executed in the communications network, identification of one or more network traffic flows in the communications network, or identification of disruption of any one of the network services or any one of the network traffic flows.

5. The method of claim 1, wherein the generating a communications architecture model includes:
receiving power grid topology component data;
receiving network component data, the network component data identifying network components in the communications architecture and associated network component attributes; and
generating the communications architecture model based on applying a determined mapping between the power grid topology component data relative to the network component data.

6. An apparatus comprising:
a device interface circuit;
a memory circuit; and
a processor circuit configured for executing a topology processor, wherein:
the topology processor executed by the processor circuit is operable for generating and storing, in the memory circuit, a power grid topology model of a power grid topology, the topology processor executed within a power utility control system providing exclusive management and control of the power grid topology via a communications network having a corresponding communications architecture overlying the power grid topology;
the topology processor operable for generating and storing, in the memory circuit, a communications architecture model of the communications architecture;
the topology processor operable for receiving, via the device interface circuit, a request for executing a change in at least a portion of the power grid topology;
the topology processor operable for identifying from the power grid topology model, in response to the request, power grid topology model data associated with the portion of the power grid topology;
the topology processor further operable for identifying from the communications architecture model, in response to the request, communications architecture model data identifying a corresponding portion of the communications architecture associated with the portion of the power grid topology; and
the topology processor operable for selectively executing the request based on sending, to a network controller, a query to determine whether the communications architecture can implement one or more communications network requirements for the change, the query identifying the power grid topology model data and the corresponding communications architecture model data.

7. The apparatus of claim 6, wherein the topology processor executed by the processor circuit further is operable for:
executing the request in response to receiving, from the network controller, a confirmation that the communications network requirements for the change has been implemented; or
terminating the request in response to receiving, from the network controller, a notification that the communications network requirements were unavailable for the change.

8. The apparatus of claim 6, wherein the topology processor executed by the processor circuit further is operable for updating the communications architecture model in response to one or more messages from the network controller describing the communications architecture.

9. The apparatus of claim 8, wherein the one or more messages specify any one of implementation of the one or more communications network requirements, identification of one or more network services executed in the communications network, identification of one or more network traffic flows in the communications network, or identification of disruption of any one of the network services or any one of the network traffic flows.

10. The apparatus of claim 6, wherein the topology processor executed by the processor circuit further is operable for:
receiving power grid topology component data;
receiving network component data, the network component data identifying network components in the communications architecture and associated network component attributes; and
generating the communications architecture model based on applying a determined mapping between the power grid topology component data relative to the network component data.

11. One or more non-transitory tangible media encoded with logic for execution by a machine and when executed by the machine operable for:
generating, by the machine executing a topology processor, a power grid topology model of a power grid topology, the topology processor within a power utility control system providing exclusive management and control of the power grid topology via a communications network having a corresponding communications architecture overlying the power grid topology;
the topology processor generating a communications architecture model of the communications architecture;
the topology processor receiving a request for executing a change in at least a portion of the power grid topology;
the topology processor identifying from the power grid topology model, in response to the request, power grid topology model data associated with the portion of the power grid topology;
the topology processor further identifying from the communications architecture model, in response to the request, communications architecture model data identifying a corresponding portion of the communications architecture associated with the portion of the power grid topology; and
the topology processor selectively executing the request based on sending, to a network controller, a query to determine whether the communications architecture can implement one or more communications network requirements for the change, the query identifying the power grid topology model data and the corresponding communications architecture model data.

12. A method comprising:
a network controller obtaining, from a topology processor in a power utility control system, power grid topology model data identifying at least a portion of a power grid topology, the power utility control system providing exclusive management and control of the power grid topology via a communications network having a corresponding communications architecture overlying the power grid topology;
the network controller obtaining, from the topology processor, communications architecture model data identifying a corresponding portion of the communications architecture associated with the portion of the power grid topology;
the network controller determining, based on the power grid topology model data and the communications architecture model data, a communications network requirement for controlling at least the portion of the power grid topology via the communications architecture;
the network controller generating, based on the power grid topology model data, software defined network (SDN) configuration data for implementing the communications network requirement in the communications architecture.

13. The method of claim 12, wherein the communications architecture model data for the portion of the communications architecture identifies network elements associated with the portion of the power grid topology, the network elements including at least one of: at least one physical data link, one or more sensor devices coupled to the data link, one or more intelligent electric devices coupled to the data link, or one or more remote terminal units coupled to the data link.

14. The method of claim 12, further comprising the network controller sending instructions for implementing the SDN configuration data to one or more network devices in the communications network.

15. The method of claim 14, wherein:
the obtaining of the power grid topology model data includes receiving a requested operation change relative to the portion of the power grid topology;
the method further comprising the network controller receiving a reply from the one or more network devices indicating whether the communications network requirement has been implemented for the requested operation change;
the method further comprising the network controller sending, in response to the reply, a notification the topology processor, the notification indicating whether the communications network requirement has been implemented for the requested change.

16. An apparatus comprising:
a device interface circuit; and
a processor circuit configured for executing a network controller, wherein:
the network controller executed by the processor circuit is operable for obtaining, from a topology processor in a power utility control system, power grid topology model data identifying at least a portion of a power grid topology, the power utility control system providing exclusive management and control of the power grid topology via a communications network having a corresponding communications architecture overlying the power grid topology;
the network controller operable for obtaining, from the topology processor, communications architecture model data identifying a corresponding portion of the communications architecture associated with the portion of the power grid topology;
the network controller operable for determining, based on the power grid topology model data and the communications architecture model data, a communications network requirement for controlling at least the portion of the power grid topology via the communications architecture;
the network controller operable for generating, based on the power grid topology model data, software defined network (SDN) configuration data for implementing via the device interface circuit the communications network requirement in the communications architecture.

17. The apparatus of claim 16, wherein the communications architecture model data for the portion of the communications architecture identifies network elements associated with the portion of the power grid topology, the network elements including at least one of: at least one physical data link, one or more sensor devices coupled to the data link, one or more intelligent electric devices coupled to the data link, or one or more remote terminal units coupled to the data link.

18. The apparatus of claim 16, wherein the network controller is further operable for sending, via the device interface circuit, instructions for implementing the SDN configuration data to one or more network devices in the communications network.

19. The apparatus of claim 18, wherein:
the network controller is further operable for obtaining the power grid topology model data based on receiving a requested operation change relative to the portion of the power grid topology;
the network controller further operable for receiving, via the device interface circuit, a reply from the one or more network devices indicating whether the communications network requirement has been implemented for the requested operation change;
the network controller further operable for sending, in response to the reply, a notification the topology processor, the notification indicating whether the communications network requirement has been implemented for the requested change.

20. One or more non-transitory tangible media encoded with logic for execution by a machine and when executed by the machine operable for:
obtaining, by the machine executing a network controller, power grid topology model data identifying at least a portion of a power grid topology from a topology processor in a power utility control system, the power utility control system providing exclusive management and control of the power grid topology via a communications network having a corresponding communications architecture overlying the power grid topology;
the network controller obtaining, from the topology processor, communications architecture model data identifying a corresponding portion of the communications architecture associated with the portion of the power grid topology;
the network controller determining, based on the power grid topology model data and the communications architecture model data, a communications network requirement for controlling at least the portion of the power grid topology via the communications architecture;

the network controller generating, based on the power grid topology model data, software defined network (SDN) configuration data for implementing the communications network requirement in the communications architecture.

\* \* \* \* \*